US010117115B2

(12) United States Patent
Svedman et al.

(10) Patent No.: US 10,117,115 B2
(45) Date of Patent: Oct. 30, 2018

(54) METHOD AND APPARATUS FOR A MODIFIED OUTER LOOP AFTER A RECEIVER OUTAGE EVENT

(71) Applicants: ZTE WISTRON TELECOM AB, Kista (SE); ZTE (TX) INC., Austin, TX (US)

(72) Inventors: Patrick Svedman, Kista (SE); Jan Johansson, Kista (SE); Thorsten Schier, Kista (SE); Bojidar Hadjiski, Kista (SE); Aijun Cao, Kista (SE); Yonghong Gao, Kista (SE)

(73) Assignee: ZTE TX INC., Plano, TX (US)

( * ) Notice: Subject to any disclaimer, the term of this patent is extended or adjusted under 35 U.S.C. 154(b) by 0 days.

(21) Appl. No.: 14/651,636

(22) PCT Filed: Dec. 12, 2013

(86) PCT No.: PCT/US2013/074767
§ 371 (c)(1),
(2) Date: Jun. 11, 2015

(87) PCT Pub. No.: WO2014/093679
PCT Pub. Date: Jun. 19, 2014

(65) Prior Publication Data
US 2015/0296394 A1 Oct. 15, 2015

Related U.S. Application Data

(60) Provisional application No. 61/737,030, filed on Dec. 13, 2012, provisional application No. 61/737,041, filed on Dec. 13, 2012.

(51) Int. Cl.
*H04W 24/04* (2009.01)
*H04L 12/825* (2013.01)
(Continued)

(52) U.S. Cl.
CPC .......... *H04W 24/04* (2013.01); *H04L 1/1812* (2013.01); *H04L 47/266* (2013.01); *H04W 52/48* (2013.01)

(58) Field of Classification Search
None
See application file for complete search history.

(56) References Cited

U.S. PATENT DOCUMENTS 8,111,624 B2 * 2/2012 Calvanese Strinati ............ H04L 1/0003
370/241
8,312,337 B2 * 11/2012 Park ............ H04L 1/0001
714/748

(Continued)

OTHER PUBLICATIONS

International Search Report and Written Opinion in International Application No. PCT/US2013/074767, dated Mar. 19, 2014, in 10 pages.

(Continued)

*Primary Examiner* — Ayaz R Sheikh
*Assistant Examiner* — Faiyazkhan Ghafoerkhan
(74) *Attorney, Agent, or Firm* — Duane Morris LLP

(57) ABSTRACT

A method, system and non transitory, tangible computer readable storage medium provides for controlling the BLER (block error rate) in a digital communication system. The outer loop control of the system discounts responses sent by a receiver to data transmission from a transmitter that were sent during a receiver outage event. Either the NACKs or both the ACKs and NACKs sent by the receiver during receiver outage are discounted by the outer loop control which adapts subsequent transmissions by either directly adjusting transmission parameters or by adjusting the selection of transmission parameters. The adapting may be based on individual NACKs and ACKs or after establishing a BLER.

28 Claims, 4 Drawing Sheets

(51) Int. Cl.
*H04L 1/18* (2006.01)
*H04W 52/48* (2009.01)

(56) References Cited

U.S. PATENT DOCUMENTS

| | | | | |
|---|---|---|---|---|
| 8,537,801 | B2* | 9/2013 | Calvanese Strinati | ...................... H04L 5/006 370/329 |
| 8,599,945 | B2* | 12/2013 | Sampath | .............. H04B 7/0417 375/260 |
| 8,711,854 | B2* | 4/2014 | Oran | ..................... H04L 1/0001 370/312 |
| 8,902,737 | B2* | 12/2014 | Ktenas | .................. H04L 1/1825 370/225 |
| 2003/0002499 | A1* | 1/2003 | Cummings | ........... H04L 1/0065 370/389 |
| 2003/0031198 | A1* | 2/2003 | Currivan | ........... H03M 13/2707 370/465 |
| 2004/0100911 | A1* | 5/2004 | Kwan | .................. H04L 1/0003 370/252 |
| 2007/0005749 | A1* | 1/2007 | Sampath | .............. H04B 7/0417 709/223 |
| 2008/0214119 | A1* | 9/2008 | Calvanese Strinati | ...................... H04L 1/0003 455/67.13 |
| 2008/0253369 | A1* | 10/2008 | Oran | ..................... H04L 1/0001 370/390 |
| 2010/0281322 | A1* | 11/2010 | Park | ..................... H04L 1/0001 714/748 |
| 2010/0287403 | A1* | 11/2010 | Jenkins | .............. G06Q 10/1093 714/2 |
| 2011/0044314 | A1* | 2/2011 | Calvanese Strinati | ...................... H04L 1/1867 370/344 |
| 2012/0269078 | A1 | 10/2012 | Weng et al. | |

OTHER PUBLICATIONS

Official Action in Japanese Patent Application No. 2015-547564, dated Jun. 30, 2016, in 9 pages.

* cited by examiner

METHOD AND APPARATUS FOR A MODIFIED OUTER LOOP AFTER A RECEIVER OUTAGE EVENT

RELATED APPLICATIONS

This application is related to and claims priority to U.S. Provisional Application No. 61/737,030, filed Dec. 13, 2012 and entitled Method and Apparatus for a Modified Outer Loop After a Receiver Outage Event, and to U.S. Provisional Application No. 61/737,041, filed Dec. 13, 2012 and entitled Method and Apparatus for a Blocking Detector in a Digital Communication System, the contents of both of which are hereby incorporated by reference as if set forth in their entirety.

TECHNICAL FIELD

This disclosure relates to digital, wireless communication systems and methods.

BACKGROUND

Many digital communication systems use Automatic Repeat reQuest (ARQ) protocols, for instance Hybrid ARQ (HARQ). In such systems, a block of information such as a wireless signal or a waveform is sent from a transmitter to a receiver. The transmitter may be a base station or a mobile unit and the receiver may be a mobile unit in some examples. In other examples, the converse is true. If the block of information is correctly received, the receiver responds to the transmitter with an acknowledgement (ACK). Otherwise, the receiver responds with a negative acknowledgement (NACK). The first time a block of information is sent is called a first transmission. A transmission of a block of information that has been previously sent and is being re-sent, is called a retransmission. The ratio of first transmission NACKs among all first transmissions is generally called the first transmission block error rate (BLER). The ratio of NACKs among all transmissions (first and retransmissions) is often called the overall BLER. As such, BLER can refer to first transmission BLER, overall BLER, or it can designate a BLER defined by other meaningful definitions.

The transmission parameters of the digital communication systems can often be adjusted in a way that affects the BLER. For example, different modulation format, channel coding rate, multiantenna transmission rank, transmission power, and other transmission parameters such as multiantenna precoder and time, frequency and code resources for the transmission and the like, can be adapted and adjusted. A very high (for example, close to 100%) BLER may often indicate poor performance. A very low (e.g., close to 0%) BLER can also result in poor performance, due to too conservative parameter settings, which result in low information data rate. Hence, good performance may be obtained at various BLERs in various systems. In some systems, good performance is associated with a moderate level of block errors, e.g. BLER=10% or a BLER within a range of 5-50%. Therefore, in many systems, a target BLER may be defined and the target BLER may take on different values.

In general, a closed-loop control system involves feedback, whereas an open-loop control system does not. In some systems, closed-loop control can be divided into outer-loop and inner-loop control. In many systems, the inner-loop functionality is configured to react quickly to changes, in order to meet some criterion. In many systems, the purpose of the outer loop functionality is to adapt the inner-loop on a longer time-scale. make the BLER as close to the target BLER as possible. One example of such a control system is transmit power control in wireless systems, which attempts to minimize the interference and keep the quality of the signal to a desired level. The outer loop power control, for which a target BLER is defined, controls a target SIR (signal to interference ratio) value for the inner-loop power control. The inner-loop power control adapts transmit power on a short time scale to meet the target SIR in the receiver. The inner-loop power control may for example compensate for channel fluctuations, called fast fading. If the actual BLER is above the target BLER, the outer-loop power control may reduce the target SIR, which would then impact the inner-loop to generally use lower transmit powers. In some examples, outer-loop power control is used to set the target quality value for inner-loop power control, i.e., it adjusts the target SIR (signal to interference ratio) which causes one or many pre-determined quality objectives to be maintained. In many systems, the outer loop functionality adjusts the transmission parameters directly and in many systems, outer loop functionality controls and adjusts the selection of transmission parameters such as but not limited to the transmission parameters listed above. In many systems, the outer loop functionality adjusts the transmission parameters directly and also adjusts the selection of transmission parameters.

In one example, if the outer loop functionality directly adapts the transmission power, then the transmission parameter may be adjusted directly, i.e. outer loop power control. In another example, if the inner loop functionality adjusts the mapping between estimated communication channel quality and the selected channel coding rate, then the outer loop link adaptation involves the selection, i.e. mapping in this case, of transmission parameters.

In some examples, the outer loop functionality measures the BLER over some time period, based on ACKs and NACKs that are collected during the time period. In some examples, the outer loop functionality adjusts a parameter in one way after each ACK and in another way after each NACK, without explicitly measuring the BLER.

In a digital communication system, the receiver receives a sum of the wanted information-bearing waveform (i.e., block of information), other interfering signals and noise. A receiver typically has a range of input signal powers that it can handle. If the input signal power is too low, the signal cannot be resolved by the receiver. If the input signal power is too high, the signal often cannot be resolved either, due to corruption and distortion or other factors. This phenomenon is often referred to as receiver blocking. The example of receiver blocking due to excessively high power can be due to too high power on the desired signal, excessively high power interference, or other factors. In many cases, the blocking lasts only as long as the input power is too high, i.e., the recovery time can be very short. When a receiver is blocked, all received signals are corrupted, even those with corresponding powers of a suitable level. The blocking itself can occur in the analog parts or in the digital parts of the receiver. In the analog parts, for example, the input signal can be in the non-linear range of the electronic components, resulting in signal saturation in some examples. In the digital parts, for example, the sample magnitude may be insufficient to represent the high power signal, resulting in signal saturation.

If the receiver is a receiver of wireless signals, the high interference power can come from a transmitter, e.g., a mobile phone, that is communicating with another receiver that is much further away than the blocked receiver or it may come from other transmitters.

One exemplary scenario of receiver blocking is when the blocked receiver is in a femto base station with a closed subscriber group (CSG) and the interfering mobile unit is close to the femto, but does not belong to the CSG. In this case, the interfering mobile transmitter may be required to use high transmit power, to reach another base-station, e.g., a Macro.

Another example of receiver blocking is a cell with distributed antennas such as an LTE (Long Term Evolution) soft cell or other suitable topologies. A mobile transmitter close to a receiving antenna transmits a random access signal (in LTE: the random access preamble) to connect to the network, using a transmit power based on the path loss from another distant antenna. This would be possible if the close receiving antenna is not configured to transmit common pilot signals (in LTE: called cell-specific reference signal, CRS), which the mobile uses to determine the transmit power of the random access signal. In this case, the transmitted random access signal can block the receiver of the close antenna, due to the high power.

Other examples can cause receiver blocking and receiver outages which can result in NACKs being sent and the present disclosure addresses aspects of events that occur during such receiver blocking and receiver outage events.

SUMMARY OF THE DISCLOSURE

According to one aspect, a method for operating a digital communication system is provided. The method comprises: providing a digital communication system with at least a transmitter and a receiver; transmitting blocks of information from the transmitter to the receiver; the receiver responding to the transmitting by sending one of an ACK (acknowledgement) and a NACK (negative acknowledgement) in response to each transmitted block of information; detecting receiver outage; determining outage NACKs and outage ACKs of the NACKs and ACKs that were sent during the receiver outage; and adapting subsequent transmissions based on the ACKs and the NACKs but not including one of (a) the outage NACKs and (b) the outage NACKs and the outage ACKs.

In some embodiments, the adapting comprises adjusting one or more transmission parameters of the digital communication system.

In some embodiments, the transmission parameters include modulation format, channel coding rate, multiantenna transmission rank, and transmission power.

In some embodiments, the adapting comprises adjusting selection of one or more transmission parameters of the digital communication system.

In some embodiments, the selection comprises a mapping between an estimated channel quality between the transmitter and receiver, and a set of transmission parameters.

In some embodiments, the set of transmission parameters includes channel coding rate, modulation format, multiantenna transmission rank and transmission power.

In some embodiments, the adapting comprises controlling a BLER (block error rate).

In some embodiments, the controlling a BLER includes adjusting transmission parameters to adjust the BLER to attain a target BLER and the BLER is a ratio of [NACKs]: [NACKs+ACKs].

In some embodiments, the controlling a BLER includes an outer loop control system discarding the one of (a) outage NACKs and (b) the outage NACKs and the outage ACKs.

In some embodiments, the adapting comprises adjusting subsequent transmissions based on individual ones of the NACKs and the ACKs but not based the outage NACKs or the outage ACKs.

In some embodiments, the adjusting subsequent transmissions comprises adjusting a transmission parameter based on an individual ACK of the individual ones of the NACKs and the ACKs and further adjusting the transmission parameter based on an individual NACK of the individual ones of the NACKs and the ACKs.

In some embodiments, the adapting comprises using a sequence of a plurality of individual NACKs and individual ACKs to adapt a corresponding plurality of subsequent transmissions.

In some embodiments, the method further comprises the receiver informing an outer loop control system which of the NACKs and ACKs comprise the outage NACKs and ACKs and wherein the adapting is done by the outer loop control system.

According to another aspect, a non-transitory, tangible computer readable storage medium encoded with computer program code, is provided. When the computer program code is executed by a processor, the processor performs a method for controlling a digital communication system with at least a transmitter and a receiver in which the transmitter transmits blocks of information to the receiver and the receiver responds to the transmitting by sending one of an ACK (acknowledgement) and a NACK (negative acknowledgement) in response to each the block of information transmitted. The method comprises: detecting receiver outage; determining outage NACKs and outage ACKs of the NACKs and ACKs that were sent during the receiver outage; and adapting subsequent transmissions based on the ACKs and the NACKs but not including one of (a) the outage NACKs and (b) the outage NACKs and the outage ACKs.

In some embodiments, the adapting comprises adjusting transmission parameters of the digital communication system and wherein the transmission parameters include modulation format, channel coding rate, multiantenna transmission rank, and transmission power.

In some embodiments, the adapting comprises adjusting selection of transmission parameters of the digital communication system.

In some embodiments, the selection comprises a mapping between an estimated channel quality between the transmitter and receiver, and a set of transmission parameters including channel coding rate, modulation format, multiantenna transmission rank and transmission power.

In some embodiments, the adapting includes controlling a BLER (block error rate).

In some embodiments, the adapting comprises adjusting subsequent transmissions based on individual ones of the NACKs and the ACKs but not based the outage NACKs or the outage ACKs.

According to another aspect, a digital communication system is provided. The digital communication system comprises: a transmitter, a receiver and a control system; the transmitter configured to transmit blocks of information to the receiver; the receiver configured to respond to the transmitting by sending one of an ACK (acknowledgement) and a NACK (negative acknowledgement) in response to each transmitted block of information; the receiver configured to detect receiver outage, determine outage NACKs and outage ACKs of the NACKs and ACKs that were sent during the receiver outage, and report the receiver outage to an outer loop control system of the control system; and the outer loop control system configured to adapt subsequent transmissions based on the ACKs and the NACKs but not including one of (a) the outage NACKs and (b) the outage NACKs and the outage ACKs.

In some embodiments, the receiver is further configured to report the outage NACKs and outage ACKs to the outer loop control system.

In some embodiments, the outer loop control system is configured to adapt subsequent transmissions by adjusting one or more transmission parameters of the digital communication system.

In some embodiments, the outer loop control system is configured to adapt subsequent transmissions by adjusting selection of one or more transmission parameters of the digital communication system and the transmission parameters include modulation format, channel coding rate, multiantenna transmission rank, and transmission power.

In some embodiments, the outer loop control system is configured to adapt subsequent transmissions by controlling a BLER (block error rate).

In some embodiments, the outer loop control system is configured to discard the one of (a) outage NACKs and (b) the outage NACKs and the outage ACKs.

In some embodiments, the adapting comprises adjusting subsequent transmissions based on individual ones of the NACKs and the ACKs but not based the outage NACKs or the outage ACKs.

BRIEF DESCRIPTION OF THE DRAWINGS

The present disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

DETAILED DESCRIPTION

Figure 1:
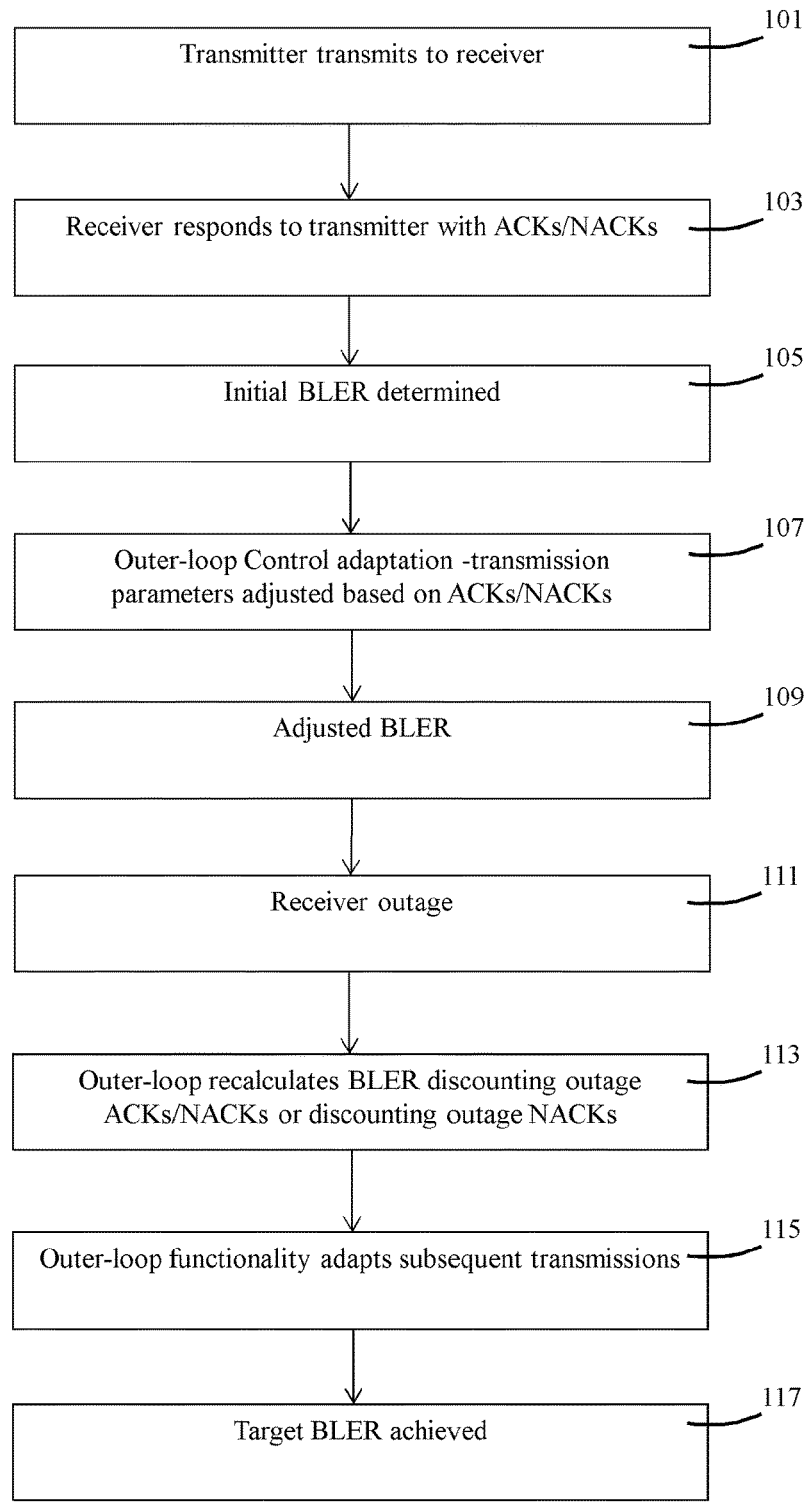
FIG. 1 is a flowchart illustrating a method according to various embodiments of the disclosure.

The disclosure provides a method, system and a tangible, non-transitory computer readable storage medium in which the outer-loop functionality of a digital communication system discards ACKs and NACKs that occur during receiver outage to adapt subsequent transmissions and provide an accurate adjusted BLER and a target BLER in a digital communication system.

The disclosure finds application is various wireless and wired digital communication systems that may be prone to receiver outage and for which transmission parameters can be adapted. The disclosure finds application is various wireless and wired digital communication systems such as but not limited to 3G (UMTS—Universal Mobile Telecommunications System), WiFi, Point-to-point wireless links, LTE, TD-SCDMA (Time Division Synchronous Code Division Multiple Access), GSM (Global System for Mobile Communications), Bluetooth, Ethernet, USB (Universal Serial Bus), and HDMI (High-Definition Multimedia Interface) systems. Additionally, the digital communication system can conform to specifications such as third generation partnership project (3GPP), 3GPP long term evolution (LTE), and like specifications. The disclosure is not limited to LTE networks and can be implemented and utilized in various different types of cellular and other communication networks.

During a receiver outage, the receiver does not function normally. A receiver outage can be due to various factors including but not limited to the following examples: receiver blocking, as described above, a temporary power failure in parts of the receiver, a circuit glitch in the receiver, jamming of the receiver, or various other outages caused by any of various other means such as described above.

During a receiver outage, the received signal is severely corrupted or lost. Hence, if a failed transmission is due to a receiver outage, increased transmission reliability, e.g., by higher transmit power or lower channel coding rate, would not have prevented the signal from being severely corrupted or lost and the disclosure provides for taking this into account when calculating and adjusting the BLER to achieve a target BLER. Receivers generally quickly recover after such an outage and the present disclosure is directed to embodiments in which the receiver recovers quickly after an outage, but is also applicable to receivers that recover at other rates. Typically, the outage duration of a receiver is in the order of milliseconds or less although other outage durations are the case in other embodiments to which the principles of the disclosure are applicable.

In some embodiments, the disclosure provides a system with a receiver that detects that it is in outage and provides such information to the outer loop control system. In various embodiments, the receiver itself is capable of detecting that it is blocked or in outage, as discussed above. Various embodiments of the disclosure find application in various other exemplary scenarios and embodiments. In various other embodiments, another system component such as the transmitter or an external node, detects receiver outage and provides such information to the outer loop control system.

The outer loop functionality is located in the transmitter in some embodiments, but is located in the receiver or in another node in other transmission system embodiments. The outer loop functionality adapts subsequent transmissions to meet a target BLER by directly adjusting transmission parameters or by adjusting the selection of transmission parameters such that the inner loop control directly adjusts the transmission parameters. In some embodiments, the inner loop adapts subsequent transmissions by directly adjusting the transmission parameters. The adaptation may be based on individual ACKs or NACKs or after a BLER has been previously determined.

Various embodiments of a method of the disclosure are as follows.

When a receiver outage is detected, various embodiments of the disclosure provide for various components such as the receiver itself, informing the outer loop functionality of the same. In one embodiment, a receiver informs the outer loop functionality of the outage and identifies which ACK/NACKs were obtained during outage. Such ACK/NACKs may be designated ACK/NACKs in outage or outage ACK/NACKs.

The outer loop functionality discards either a), both the outage ACKs and outage NACKs, or b) the outage NACKs. In various embodiments, the outage ACK/NACKs are not used by the outer loop control in an adaptation of subsequent transmissions. In various embodiments, the outage ACK/NACKs are not used by the outer loop control in an evaluation of the BLER nor any adjustments directly made to transmission parameters or to the selection of transmission parameters, to adjust the BLER. In various other embodiments, the outage NACKs are not used in an evaluation of the BLER nor any adjustments made to transmission parameters or to the selection of transmission parameters, to adjust the BLER.

One aspect of the disclosed method, is that the block error probability during outage is not primarily due to adjustable and other transmission parameters such as channel coding rate or transmission power. Instead, the outage itself is the main factor in block error probability during outage, with the outage being considered an external event. Therefore, the disclosure provides for the outer loop discounting either the NACKs or both the NACKs and ACKs generated by the receiver during receiver outage, i.e. the outer loop does not adapt to these transmissions in this embodiment. The disclosure therefore provides the advantage that the BLER is accurate and not influenced by outage ACK/NACKs. The disclosure therefore also provides that transmission parameters adjusted based on the BLER, are not influenced by outage ACK/NACKs. Thereby the BLER based on the transmissions not in outage, can be used to more easily achieve a target BLER. In some embodiments, the methods of the disclosure are applied to first transmission BLER and in other embodiments the methods of the disclosure are applied to overall BLER and in still other embodiments, this method is applied to BLERs defined in other manners.

The following numerical example is provided for illustration only. According to one embodiment, 20% of all transmissions from a transmitter over a time period, are sent during receiver outage and each transmission during this outage time period results in the receiver sending an outage NACK. This results in a BLER of at least 20% over the time period if the transmissions sent during outage are also included. Consider an embodiment in which the target BLER is 10%. According to this embodiment, regardless of the changes and the extent of changes to the transmission parameters, the target BLER cannot be met over the time period. According to this embodiment, regardless of the degree and extent of reduction of modulation order and channel coding rate and regardless of the degree of transmission power increase or any other transmission parameter adjustments, the target BLER in unachievable if the disclosed method is not used. This could result in very low performance, since the data rate during the transmissions not in outage would be forced to a minimum in order to bring down the BLER. According to the disclosed method and system, the BLER of the transmissions not in outage can meet the target 10%, thereby achieving good performance This is presented as one embodiment to illustrate a numerical analysis, but in other embodiments, other percentages of transmission outages are the case and other target BLER's are used and the aspects of the disclosure apply to such other embodiments.

In various embodiments of the disclosure, the ACK/NACKs in outage are discarded in the outer loop functionality and the transmission parameters are directly adjusted so that the target BLER is met for the transmissions not in outage. In various embodiments of the disclosure, the ACK/NACKs in outage are discarded in the outer loop functionality and the selection of transmission parameters is adjusted so that the target BLER is met for the transmissions not in outage. In summary and alternatively stated, the ACK/NACKs in outage are discarded in the outer loop functionality and not included in the adaptation of subsequent transmissions so that the target BLER is met. In this manner, the performance of the transmissions not in outage can be maintained.

Subsequent transmissions are adapted by the outer loop functionality by adjusting transmission parameters or the selection of transmission parameters by computing the BLER explicitly in some embodiments and in other embodiments, the BLER is not computed explicitly but the ACKs and/or NACKs are directly used to adapt the system.

FIG. 1 is a flowchart showing various aspects of a method according to the disclosure in which one embodiment includes the BLER being computed explicitly in adapting subsequent transmissions of the system.

At step 101, the transmitter transmits to the receiver. The transmission may be a wireless or wired transmission and takes place over a time period. According to the embodiment in which the transmission is a wireless signal, various types of wireless signals such as a carrier modulated signal carrying a block of information such as a PDSCH (Physical Downlink Shared Channel) or a PUSCH (Physical Uplink Shared Channel) signal in LTE, or other waveforms are transmitted from the transmitter to the receiver. In this manner, a block of information is transmitted from the transmitter to the receiver with various transmission parameters at step 101. At step 103, the receiver responds to the transmission of step 101 by sending either an acknowledgment, ACK or a negative acknowledgment, NACK in response to each transmission from the transmitter. If the block of information is correctly received, the receiver responds to the transmitter with an ACK. Otherwise, the receiver responds with an NACK at step 103. The ACKs/NACKS are sent to the transmitter and other system components.

At step 105, a BLER, block error rate, is established. The BLER, block error rate, may be established by the receiver, the outer loop control system or other system component. In some embodiments, the BLER represents a ratio of NACKs:[NACKs and ACKs]. In other embodiments, the BLER represents the ratio of NACKs:ACKs. In some embodiments, the BLER is expressed as a percentage such as percentage of NACKs in the total responses (NACKs and ACKs) sent by the receiver. In some embodiments, the BLER is a first transmission BLER and in other embodiments, the BLER is an overall BLER, including first transmissions and retransmissions. The BLER is calculated by the outer-loop power control of the system in some embodiments and in other embodiments, the BLER is calculated by the receiver. In still other embodiments, the BLER is determined by other system components.

At step 107, the outer-loop functionality of the system adapts subsequent transmissions. In some embodiments, the outer loop adaptation involves adjusting transmission parameters, as necessary to achieve a target BLER, based upon the NACKs and the ACKs. In some embodiments, the outer-loop functionality of the system adapts subsequent transmissions based upon the BLER and in some embodiments, the outer-loop functionality of the system adapts subsequent transmissions based on one or more ACKs/NACKs without considering the BLER, i.e. step 105 is bypassed.

At step 107, the outer-loop functionality has received a target BLER for the system. The target BLER takes on various values in various embodiments. In some embodiments, the target BLER may be about 5-50%. In some embodiments, the outer-loop functionality adjusts the transmission parameters directly and in some embodiments, the outer-loop functionality adjusts the selection of transmission parameters such as but not limited to the previously recited transmission parameters, as discussed above. In some embodiments, the outer-loop functionality measures the BLER over some time period based on the ACKs and NACKs that are collected during the time period and makes transmission parameter adjustments accordingly. In other embodiments, the outer-loop functionality adjusts a parameter in one manner after each ACK and in another manner after each NACK without explicitly measuring the BLER or collecting data over a time period. The outer-loop control adjusts transmission parameters such as the modulation format, channel coding rate, multi-antenna transmission rank, transmission power or various other suitable transmission parameters. In some embodiments, if the outer loop functionality directly adapts the transmission power, then outer loop adaptation includes the direct adjustment of one or more transmission parameters, i.e. outer loop control. In some embodiments, the outer loop adaptation includes the adjustment of the selection of transmission parameters such as an adjustment of the mapping between estimated communication channel quality and the selected channel coding rate. In some embodiments, if the inner loop functionality performs the mapping between estimated communication channel quality and the selected channel coding rate, then the outer loop link adaptation involves adjusting the selection, i.e. mapping in this case, to transmission parameters.

In various embodiments, the selection of transmission parameters includes a mapping between an estimated channel quality between the transmitter and receiver, and various other transmission parameters. The transmission parameters includes channel coding rate, modulation format, multiantenna transmission rank and transmission power. In some LTE embodiments, the mapping is a mapping from an estimated channel quality indicator (CQI) in LTE to a modulation and coding scheme (MCS) in LTE.

The digital communication system continues operation and the transmitter continues to transmit to the receiver and the receiver may continue to respond to the transmitter with ACKs/NACKs as described in conjunction with steps 101 and 103. At step 109, an adjusted BLER is determined by the outer-loop functionality based on all ACKs and NACKs as described above and in some embodiments, the target BLER may be achieved.

Figure 2:
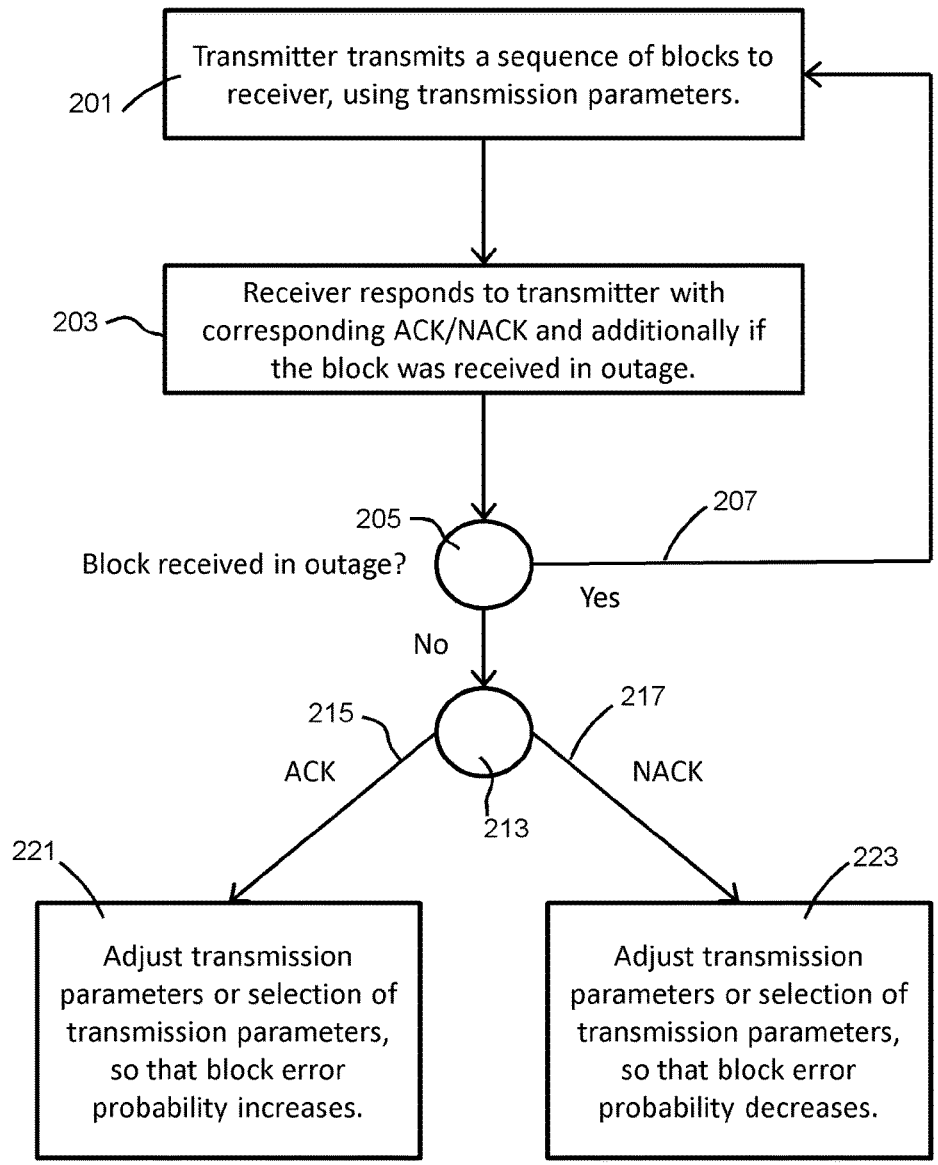
FIG. 2 is a flowchart illustrating a method according to various embodiments of the disclosure.

In some embodiments, steps 105, 107 and 109 are bypassed and the BLER is not controlled prior to the receiver outage event at step 111 (see FIG. 2).

The digital communication system continues operation as above and at step 111, a receiver outage event occurs. The receiver outage event is caused by various factors such as receiver blocking, a temporary power failure in parts of the receiver, a circuit glitch in the receiver, or various receiver outages in various embodiments, as described above. In some embodiments, the receiver detects its own outage and provides the information to the outer-loop control system and informs the outer-loop control system which ACK/NACKs were obtained during the outage. Such ACK/NACKs may be designated ACK/NACKs in outage or outage ACK/NACKs. At step 113, the outer loop control calculates the BLER discounting the events during receiver outage. In various embodiments, at step 113, the outer-loop power control calculates the BLER discounting the outage ACK and outage NACKs and in some embodiments, the outer-loop power control calculates the BLER discounting the outage NACKs.

At step 115, the outer-loop functionality adapts subsequent transmissions, i.e. adjusts transmission parameters or the selection of transmission parameters, as necessary, as described above in conjunction with step 107, but at step 115, the adjustments is based upon the BLER which is calculated after the outage ACKs and NACKs (or the outage NACKs) are discounted. At step 115, the outer loop functionality adjusts the transmission parameters directly or the selection of transmission parameters such as described above and will do this based on the ACKs and NACKs received over a time period, but not including either the outage NACKS or not including the outage NACKs and outage ACKs. In some embodiments, the outer loop functionality adjusts transmission parameters or the selection of transmission parameters based on a single ACK or a single NACK. At step 117, the target BLER is achieved. The target BLER takes on various values in various embodiments and is achievable due to the methods of the disclosure by adjusting transmission parameters or selection of transmission parameters based on the BLER obtained after discounting the outage NACKs or the outage ACKs and NACKs.

FIG. 2 is a flowchart according to an embodiments of the disclosure in which adaptation of subsequent transmissions is carried out without explicitly calculating the BLER.

In FIG. 2, the BLER is not computed explicitly, but rather one or more ACKs and/or NACKs is directly used to adapt the system i.e., to adapt subsequent transmission parameters. At step 201, the transmitter transmits to a receiver. A sequence of blocks of information are transmitted from the transmitter to the receiver using transmission parameters at step 201. At step 203, the receiver responds to the transmitter's transmission by sending either an acknowledgement, ACK or a negative acknowledgment, NACK in response to each transmission from the transmitter. The receiver is capable of detecting receiver outage events and at step 203, the receiver also indicates if the ACK/NACK was transmitted in response to a block of information that was received in outage.

At step 205, it is determined if the block of information was received in outage. If no 211, then the outer loop control or the outer loop control in conjunction with the inner loop control adapts subsequent transmissions based on an ACK 215 or a NACK 217. If an ACK 215 is used, the transmission parameters are adjusted directly or the selection of transmission parameters is adjusted so that the BLER probability increases based upon an ACK for example by reduced transmission powers, increased coding rates, increased modulation order, etc. The adjustment increases the BLER based upon ACKs because ACKs are representative of a positive acknowledgment and are thus associated with a lower BLER. At step 223, if based upon NACKs 217, the transmission parameters are adjusted directly or the selection of transmission parameters is adjusted so that the BLER probability decreases, for example by increased transmission powers, reduced coding rates, reduced modulation order, etc. The adjustment decreases the BLER based upon NACKs because NACKs are representative of negative acknowledgments and are thus associated with a higher BLER. At either of steps 221, 223 adaptations of subsequent transmissions are made by the outer loop control or by the outer loop control in conjunction with the inner loop control based on an ACK/NACK not received in outage.

In some embodiments, the adaptations of subsequent transmissions entails adjusting subsequent transmissions by first adjusting a transmission parameter based on an individual non-outage ACK and then further adjusting the parameter differently based on an individual non-outage NACK.

In some embodiments, the adaptation of subsequent transmissions entails using a sequence of multiple individual NACKs and individual ACKs to adapt a corresponding number of subsequent transmissions.

If the ACK/NACK was sent in response to a transmission received in outage (yes 207), the outer loop control does not adapt subsequent transmissions based on this outage ACK or outage NACK. Rather, at yes 207, another transmission by the transmitter at step 201 is evaluated. The transmitter continues to transmit at step 201 and the receiver responds at step 203 and transmission adaptations are only made at step 221, 223, if the block of information sent at step 201 was not received by the receiver in outage.

Figure 3:
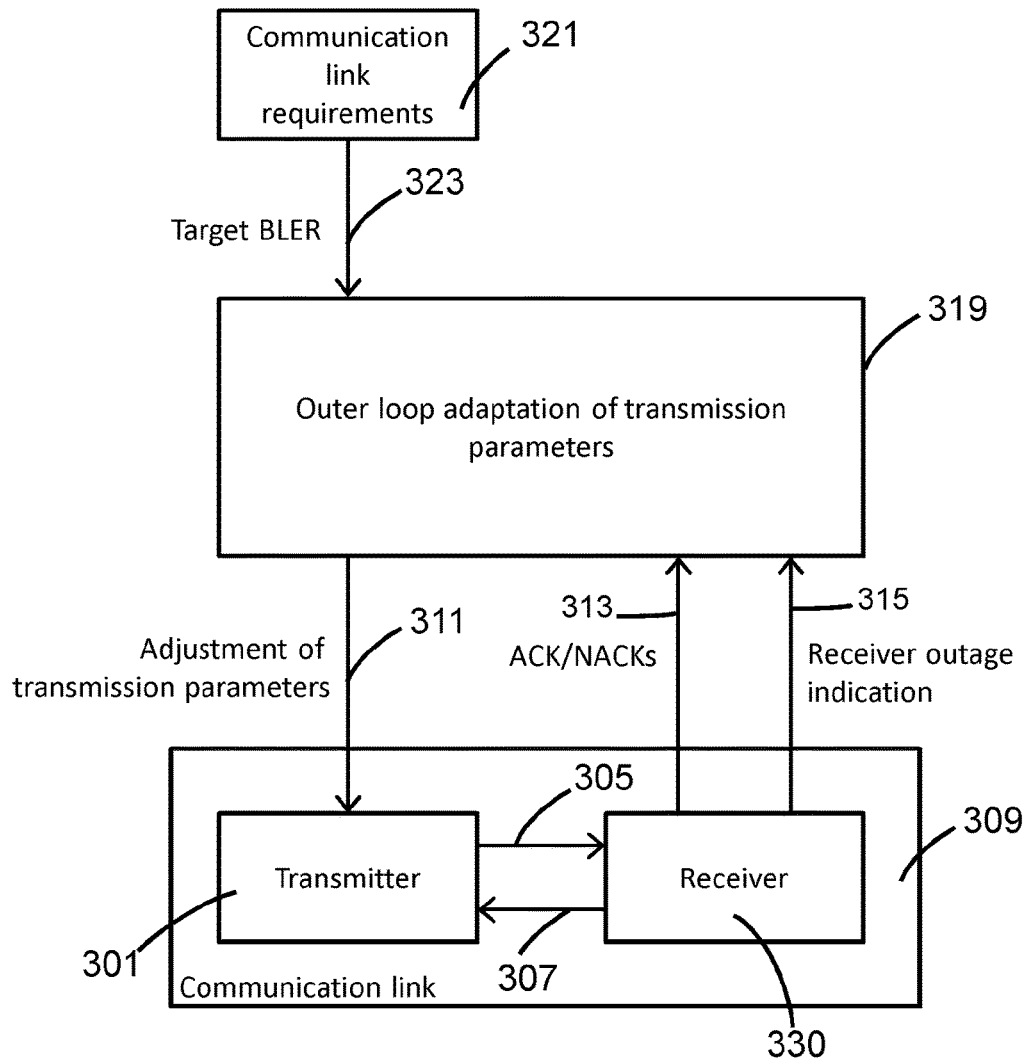
FIG. 3 is a block diagram showing various embodiments of the disclosure.
Figure 4:
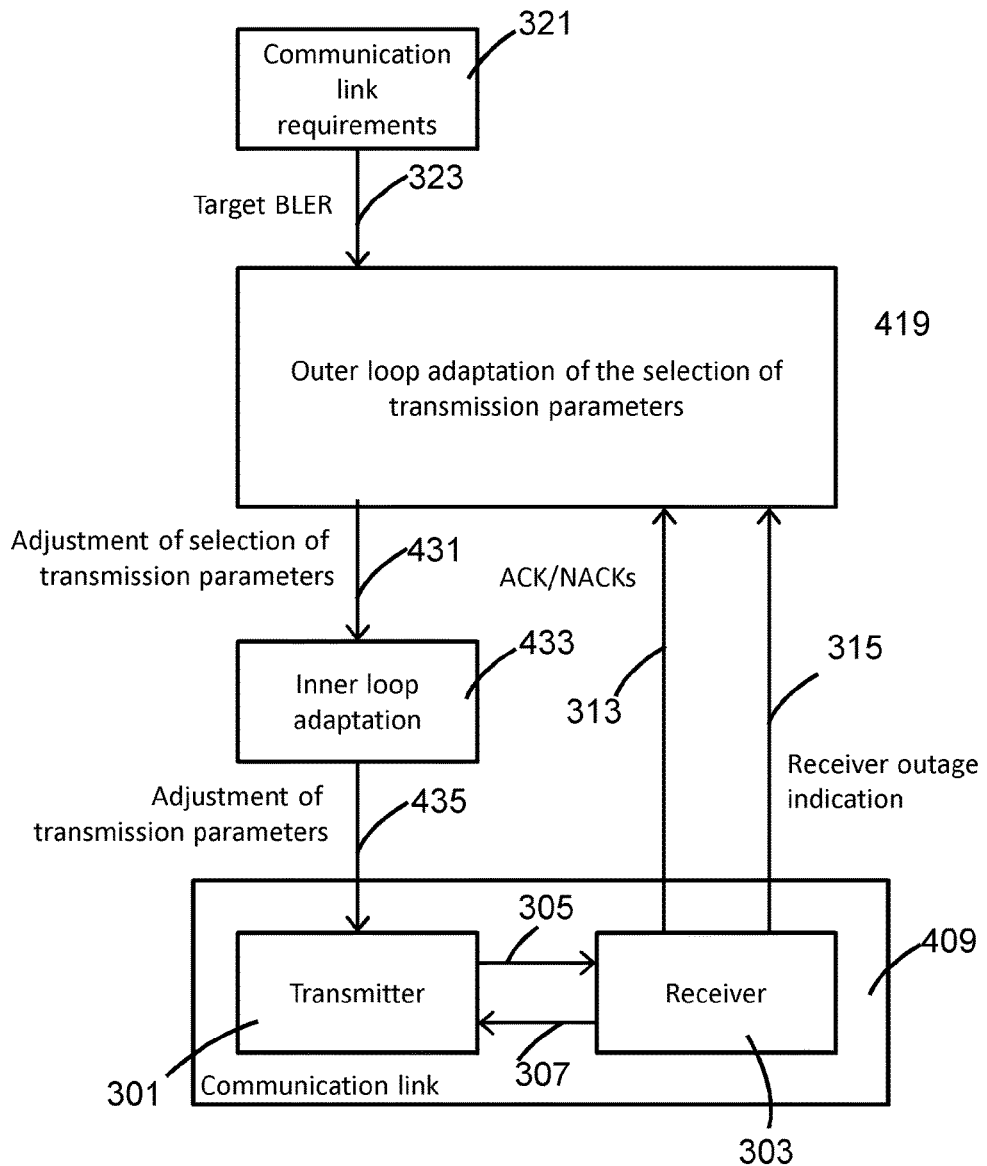
FIG. 4 is a block diagram showing various embodiments of the disclosure.

FIGS. 3 and 4 show embodiments of various digital, wireless communication systems such as but not limited to a mobile phone network. FIGS. 3 and 4 represent various types of digital communication systems such as LTE, UMTS, GSM and WiFi in various embodiments. FIGS. 3 and 4 each apply to each of the embodiments illustrated by the flowcharts of FIGS. 1 and 2.

Now referring to FIG. 3, in various embodiments, transmitter 301 is a base station, relay or repeater and in other embodiments transmitter 301 is a cellular telephone or other UE (user equipment) capable of transmitting a signal. Receiver 303 may be a cellular telephone, or other mobile unit or other UE such as a relay or repeater. Transmitter 301 and receiver 303 form part of communication link 309 of a digital communication system. Signal 305 is sent from transmitter 301 to receiver 303 and may be a wireless signal or other waveform in some embodiments and it may be a wired signal in other embodiments Signal 305 represents a block of information sent from transmitter 301 to receiver 303. Signal 307 is sent from receiver 303 to transmitter 301 and includes ACKs (acknowledgments) and NACKs (negative acknowledgments) as described above. ACKs (acknowledgments) and NACKs (negative acknowledgments) are also sent to and received by other system components, in other embodiments. In one embodiment, ACKs and NACKs are also sent 313, to outer loop control 319.

Receiver 303 also sends receiver outage information 315 to outer loop control 319 including information on the receiver outage event and if the ACKs and NACKs were sent from receiver 303 during a receiver outage event, i.e. if ACKs and NACKs are outage ACKs or NACKs because they were sent in response to a block of information sent as signal 305 during a receiver outage event. The receiver data 313, 315 is provided regularly to outer loop control 319 and includes receiver data over a time period. Outer loop control 319 may evaluate receiver data 313 and 315 over a time period in some embodiments, and outer loop control 319 also reviews receiver data 313 and 315 for individual ACKs or NACKs in other embodiments. Receiver outage information 315 is sent by the receiver 303 itself in some embodiments and is sent by other system components in other embodiments.

The BLER may be one of the communication link requirements and outer loop control 319 has received a target BLER 323 from communication link requirements 321. The target BLER takes on various values in various embodiments and depends on the type and various aspects of the digital communications system. Outer loop control 319 discounts either the NACKs or both the ACKs and NACKs that were sent during the outage event and adapts transmission parameters based on ACKs/NACKs not in outage. At step 311, transmission parameters are adjusted directly by outer loop control 319 to adapt subsequent transmissions and to achieve the target BLER.

FIG. 4 is a block diagram that shows another embodiment of a transmitter and receiver according to various embodiments of digital, wireless communication systems such as described above. In FIG. 4, the outer loop control adapts subsequent transmissions by adjusting the selection of transmission parameters in conjunction with an inner loop adaptation. In FIG. 4, like reference numbers denote like features as described above.

Referring to FIG. 4, communication link 409 includes transmitter 301, receiver 303 and inner loop control 433 but it should be understood that in other embodiments, inner loop control 433 is located in other internal or external nodes of the digital communication system. Outer loop control 419 adapts the selection of transmission parameters by adjusting the selection of transmission parameters at step 431. Inner loop control 433 adapts subsequent transmission parameters by directly adjusting the transmission parameters at step 435.

The disclosure also provides a digital communications system with components for carrying out the above-described method. The components include a transmitter, a receiver, an outer loop control, an inner loop power control, and other suitable components.

The disclosure also provides a non-transitory, tangible computer readable storage medium with instructions. When a computer or other processor carries out the instructions on the non-transitory, tangible computer readable storage medium, the outer loop functionality and control as described above, is carried out.

The word "exemplary" is used herein to mean "serving as an example or illustration." Any aspect or design described herein as "exemplary" is not necessarily to be construed as preferred or advantageous over other aspects or designs.

While one or more embodiments of the disclosure have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by an appropriately configured module. The term "module" as used herein, refers to software that is executed by one or more processors, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the disclosure.

Additionally, one or more of the functions described in this document may be performed by means of computer program code that is stored in a "computer program product", "computer-readable medium", "non-transitory, tangible computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

The preceding merely illustrates the principles of the disclosure. It will thus be appreciated that those skilled in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the disclosure has been described in terms of exemplary embodiments, it is not limited thereto. Rather, the appended claims should be construed broadly, to include other variants and embodiments of the disclosure, which may be made by those skilled in the art without departing from the scope and range of equivalents of the disclosure.

What is claimed is:

1. A method for operating a digital communication system, said method comprising:
    transmitting blocks of information from a transmitter to a receiver of the digital communication system;
    said receiver responding to said transmitting by sending one of an ACK (acknowledgement) and a NACK (negative acknowledgement) in response to each said transmitted block of information;
    detecting, at the receiver, a receiver outage wherein the receiver itself is temporarily not functioning properly;
    indicating, from the receiver, which of said sent NACKs and ACKs are receiver outage NACKs and receiver outage ACKs sent in response to a block of said information received during said receiver outage;
    adapting subsequent transmissions based on said ACKs and said NACKs while excluding one of (a) said receiver outage NACKs and (b) said receiver outage NACKs and said receiver outage ACKs; and
    sending the subsequent transmissions based on the adapting.

2. The method as in claim 1, wherein said adapting comprises adjusting one or more transmission parameters of said subsequent transmissions of said digital communication system based on said ACKs and said NACKs while excluding one of (a) said receiver outage NACKs and (b) said receiver outage NACKs and said receiver outage ACKs.

3. The method as in claim 2, wherein said transmission parameters include modulation format, channel coding rate, multiantenna transmission rank, and transmission power.

4. The method as in claim 2, further comprising: adjusting the one or more transmission parameters based on a mapping between a channel quality indicator and a modulation and coding scheme.

5. The method as in claim 2, further comprising adjusting the one or more transmission parameters based on at least one of:
    mapping a channel quality indication to a modulation and coding scheme associated with a first block error rate (BLER) probability based on the ACK, and
    mapping the channel quality indication to the modulation and coding scheme associated with a second block error probability based on the NACK, wherein the first block error rate (BLER) probability is higher than the second block error probability.

6. The method as in claim 1, wherein said adapting comprises adjusting selection of one or more transmission parameters of said digital communication system.

7. The method as in claim 6, wherein said selection comprises a mapping between an estimated channel quality between said transmitter and said receiver, and a set of transmission parameters.

8. The method as in claim 7, wherein said set of transmission parameters includes channel coding rate, modulation format, multiantenna transmission rank and transmission power.

9. The method as in claim 1, wherein said adapting comprises controlling a BLER (block error rate).

10. The method as in claim 9, wherein said controlling a BLER includes adjusting transmission parameters to adjust said BLER to attain a target BLER and said BLER is a ratio of [NACKs]:[NACKs+ACKs].

11. The method as in claim 10, wherein said controlling a BLER includes an outer loop control system discarding said one of (a) receiver outage NACKs and (b) said receiver outage NACKs and said receiver outage ACKs.

12. The method as in claim 1, wherein said adapting comprises adjusting subsequent transmissions based on individual ones of said NACKs and said ACKs but not based said receiver outage NACKs or said receiver outage ACKs.

13. The method as in claim 12, wherein said adjusting subsequent transmissions comprises adjusting a transmission parameter based on an individual ACK of said individual ones of said NACKs and said ACKs and further adjusting said transmission parameter based on an individual NACK of said individual ones of said NACKs and said ACKs.

14. The method as in claim 12, wherein said adapting comprises using a sequence of a plurality of individual NACKs and individual ACKs to adapt a corresponding plurality of subsequent transmissions.

15. The method as in claim 1, further comprising said receiver informing an outer loop control system which of said NACKs and ACKs comprise said receiver outage NACKs and ACKs and wherein said adapting is done by said outer loop control system.

16. A non-transitory, tangible computer readable storage medium encoded with computer program code, wherein, when the computer program code is executed by a processor, the processor performs a method for controlling a digital communication system with at least a transmitter and a receiver in which said transmitter transmits blocks of information to said receiver and said receiver responds to said transmitting by sending one of an ACK (acknowledgement) and a NACK (negative acknowledgement) in response to each said block of information transmitted, said method comprising:
    detecting, at the receiver, a receiver outage wherein the receiver itself is temporarily not functioning properly;
    indicating, from the receiver, which of said sent NACKs and ACKs are receiver outage NACKs and receiver outage ACKs sent in response to a block of said information received during said receiver outage;
    adapting subsequent transmissions based on said ACKs and said NACKs while excluding one of (a) said receiver outage NACKs and (b) said receiver outage NACKs and said receiver outage ACKs; and
    sending the subsequent transmissions based on the adapting.

17. The non-transitory, tangible computer readable storage medium as in claim 16, wherein said adapting comprises adjusting transmission parameters of said digital communication system and wherein said transmission parameters include modulation format, channel coding rate, multiantenna transmission rank, and transmission power.

18. The non-transitory, tangible computer readable storage medium as in claim 16, wherein said adapting comprises adjusting selection of transmission parameters of said digital communication system.

19. The non-transitory, tangible computer readable storage medium as in claim 18, wherein said selection comprises a mapping between an estimated channel quality between said transmitter and said receiver, and a set of transmission parameters including channel coding rate, modulation format, multiantenna transmission rank and transmission power.

20. The non-transitory, tangible computer readable storage medium as in claim 16, wherein said adapting includes controlling a BLER (block error rate).

21. The non-transitory, tangible computer readable storage medium as in claim 16, wherein said adapting comprises adjusting subsequent transmissions based on individual ones of said NACKs and said ACKs but not based said receiver outage NACKs or said receiver outage ACKs.

22. A digital communication system comprising:
    a transmitter, a receiver and a control system;
    said transmitter configured to transmit blocks of information to said receiver;
    said receiver configured to respond to said transmitting by sending one of an ACK (acknowledgement) and a NACK (negative acknowledgement) in response to each said transmitted block of information;
    said receiver configured to detect receiver outage wherein the receiver itself is temporarily not functioning properly, determining which of said NACKs and ACKs are receiver outage NACKs and receiver outage ACKs sent in response to a block of said information received during said receiver outage, and report said receiver outage to an outer loop control system of said control system; and
    said outer loop control system configured to adapt subsequent transmissions based on said ACKs and said NACKs while excluding one of (a) said receiver outage NACKs and (b) said receiver outage NACKs and said receiver outage ACKs, wherein the receiver is configured to send the subsequent transmissions as adapted by the outer loop control system.

23. The digital communication system as in claim 22, wherein said receiver is further configured to report said receiver outage NACKs and receiver outage ACKs to said outer loop control system.

24. The digital communication system as in claim 22, wherein said outer loop control system is configured to adapt subsequent transmissions by adjusting one or more transmission parameters of said digital communication system.

25. The digital communication system as in claim 22, wherein said outer loop control system is configured to adapt subsequent transmissions by adjusting selection of one or more transmission parameters of said digital communication system and said transmission parameters include modulation format, channel coding rate, multiantenna transmission rank, and transmission power.

26. The digital communication system as in claim 22, wherein said outer loop control system is configured to adapt subsequent transmissions by controlling a BLER (block error rate).

27. The digital communication system as in claim 22, wherein said outer loop control system is configured to discard said one of (a) receiver outage NACKs and (b) said receiver outage NACKs and said receiver outage ACKs.

28. The digital communication system as in claim 22, wherein said adapting comprises adjusting subsequent transmissions based on individual ones of said NACKs and said ACKs but not based said receiver outage NACKs or said receiver outage ACK.

* * * * *